United States Patent [19]
Weil et al.

[11] Patent Number: 4,820,896
[45] Date of Patent: Apr. 11, 1989

[54] METHOD AND APPARATUS PRODUCING DRAWN COPPER WIRE FROM AN ELECTRICAL SEAM WELDER

[75] Inventors: Wolfgang H. Weil, Heitersheim, Fed. Rep. of Germany; Hanspeter Fankhauser, Irvington, N.Y.

[73] Assignee: Elpatronic, AG, Switzerland

[21] Appl. No.: 726,095

[22] Filed: Apr. 23, 1985

[30] Foreign Application Priority Data

Apr. 24, 1984 [CH] Switzerland .................. 2029/84

[51] Int. Cl.$^4$ .................. B23K 35/00; B23K 11/32
[52] U.S. Cl. .................. 219/83; 219/155; 219/162
[58] Field of Search .................. 219/64, 81, 83, 50, 219/155, 162; 72/275; 148/11.5 C

[56] References Cited

U.S. PATENT DOCUMENTS

| 2,838,651 | 6/1958 | Smith | 219/64 |
| 3,596,043 | 7/1971 | Sporri | 219/83 |
| 3,717,745 | 2/1973 | Kosonen et al. | 219/155 |
| 3,842,235 | 10/1974 | Opprecht | 219/84 X |
| 4,572,937 | 2/1986 | Opprecht et al. | 219/83 |
| 4,613,740 | 9/1986 | Ichikawa | 219/69 W |

FOREIGN PATENT DOCUMENTS

| 370175 | 8/1963 | Switzerland . |
| 436513 | 11/1967 | Switzerland . |
| 519961 | 4/1972 | Switzerland . |
| 536163 | 6/1973 | Switzerland . |
| 552436 | 8/1974 | Switzerland . |

OTHER PUBLICATIONS

Smithells, C. J., Tungsten, Chapman and Hall, 1952, pp. 106–111.
Schuler-Prospectus, "LCS Body Welder".
Soudronic Propectus, "VSA 50 E".

Primary Examiner—Clifford C. Shaw
Assistant Examiner—C. M. Sigda
Attorney, Agent, or Firm—McCormick, Paulding & Huber

[57] ABSTRACT

The copper wires employed for electrical resistance seam welding of tinned sheet metal with the help of wire electrodes until now had to be taken back to the smelter as old metal after a few applications. The additional operating costs associated with this were until now unavoidable for long seam resistance welding of tinned sheet metal since multiple uses or applications of the copper wire for resistance seam welding have proven to be impossible in spite of years of research. The problem of these additional operating costs can be solved such that new copper wires with a reduced diameter can be directly drawn from the copper wire employed as wire electrodes for resistance seam welding after their use in welding. These wires then, for example, can be used as signal conductors or as windings. The properties of these wires are totally in accord with copper wires that are directly drawn from new copper. By this process, the additional operating costs mentioned above are substantially reduced and in many cases are even totally eliminated.

13 Claims, 5 Drawing Sheets

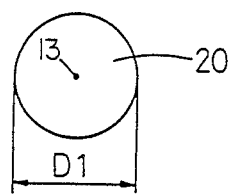
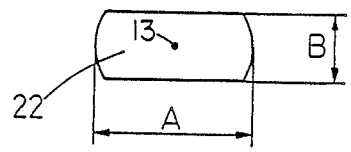
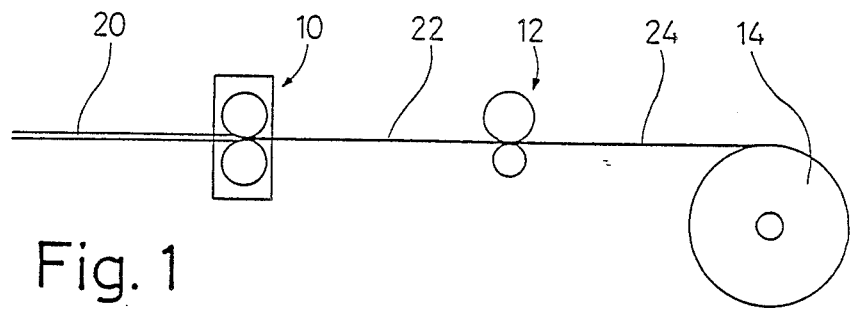
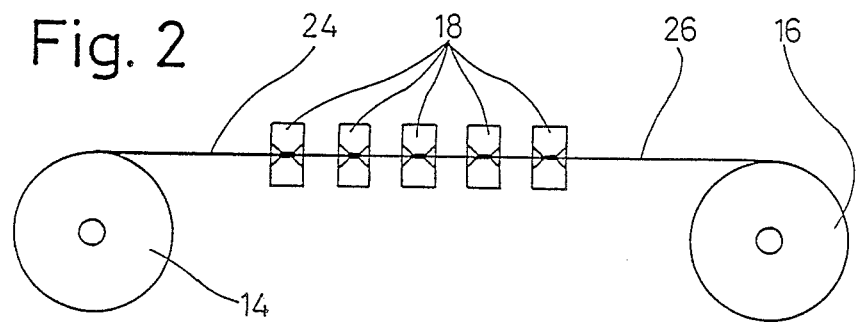
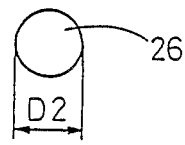

METHOD AND APPARATUS PRODUCING DRAWN COPPER WIRE FROM AN ELECTRICAL SEAM WELDER

BACKGROUND OF THE INVENTION

The invention relates to a method permitting multiple uses of a copper wire which is used in a first application as a wire electrode for electrical resistance seam welding, in particular for tinned sheets. For this purpose, the wire is formed into a wire with a cross section departing from the circular form, particularly into a flat wire, before the first use, and is hardened in that form. The wire is contaminated during the first application in the region coming into contact with the weld by material originating from the weld and passing over the wire during welding.

From the earliest known research for electrical resistance seam welding of tinned sheet metal using copper wire as the wire electrode, it had been considered to use the copper wire employed as the electrode multiple times.

Such was already thought of, for example, in the first unproductive research described in U.S. Pat. No. 2,838,651 for electrical resistance seam welding of tinned sheet metal with the application of wire electrodes, the electrodes established contact between the electrode roll and the weld and thereby prevented contamination of the electrode roll by the tin from the weld. It was thought that the wire electrodes coming into contact with the weld and contaminated thereby due to the tin passing over the wire from the weld could be freed of this contamination and accordingly could be renewed to be used again as a wire electrode in the same welding machine (U.S. Pat. No. 2,838,651, column 4, lines 39–54). Here consideration was given to removing the contamination from the wire electrode in that the wire electrode was to be guided through a calibrated hole with a diameter slightly smaller than the original wire diameter "so that a thin outer coating of the wire is removed by the process and thereby the removal of any type of foreign material from the wire is guaranteed." (U.S. Pat. No. 2,838,651, column 4, lines 43–45).

Actually, however, the method described in U.S. Pat. No. 2,838,651 cannot be put into practice for a number of reasons. The principal reason for this is that the wire electrode is flattened in passing the welding point under the pressure of the electrode roll and is thereby lengthened. (The effect of this flattening of the wire electrode and the resulting wire lengthening is known, for example, from Swiss Pat. No. 436,512 and was not overcome for over ten years after the publication of U.S. Pat. No. 2,838,651 by the features described in the Swiss Pat. No. 536,163). Because of the wire lengthening resulting from the flattening under the first of the two electrode rolls, which the electrode wire has to pass according to the method of U.S. Pat. No. 2,838,651 and the condition that requires the wire electrode to pass the two electrode rolls at the same speed (U.S. Pat. No. 2,838,651, Column 4, Lines 9–33), the result is that a bend or bow occurs in the wire slide between the first and second electrode rolls which leads practically to a functional inability to accomplish the method according to U.S. Pat. No. 2,838,651. The effect of flattening and the bow formation resulting therefrom can be substantially overcome later, as is already mentioned above, by the features of Swiss Pat. No. 536,163.

Apart from the general functional inoperability of the method described in U.S. Pat. No. 2,838,651 resulting from the stated flattening of the electrode wires, the anticipated passage of the wire electrode through the calibrated orifice did not lead to the intended result. Because the flattening of the wire electrode with the pressure of the electrode rolls leads necessarily to the fact that those regions of the wire electrode which come into contact with the weld and are thereby contaminated by tin also immediately, are the same areas which are flattened and leveled off. If now, as stated above, a thin outer coating of the wire is removed by the die, then the flattened and leveled peripheral regions of the wire electrode will not be comprehended or included with this removal. This is because the distance of the flattened regions from the axis or correspondingly the wire center is less than the distances of the other peripheral regions of the wire after the removal of the thin outer coating, so that even in those regions of the wire which are contaminated with tin, the contamination will not be removed by the passage of the wire electrode through the calibrated hole. Besides, the general concept of making wire electrodes utilized in resistance seam welding usable again in the same welding machine after its use by means of a reduction in diameter is naturally in practice not entirely realized, because the wire electrode must be in adjacent relationship to the electrode roll with a relatively large outer surface so that the contact resistance between the electrode rolls of the wire is made as small as possible and so that a welding of the electrode wire to the electrode rolls is foreclosed. Such a relatively large contact surface between the wire electrode and the electrode roll is therefore only achievable if the electrode fits precisely in the groove provided for it in the electrode roll and with this its peripheral region lying within the groove fully adjacent the groove walls, and if the bending radius of the groove walls is the same as the radius of the electrode wire. These conditions are naturally no longer fulfilled with the diameter of the electrode wire reduced. In other words, the reduction of the diameter of the electrode wire arising from the calibrated orifice leads to the fact that the electrode wire, no longer flat shaped, but only linearly shaped, lies in the groove provided for it in the electrode roll and produces thereby a larger contact resistance between the electrode roll and the wire electrode and with it the danger of welding the electrode wire to the electrode roll. In addition, there is still the fact that with an electrode wire of reduced diameter there is simultaneously also a poor guidance of the wire in the groove provided in the electrode roll which can lead to a jumping of the wire from under the electrode roll in the welding mechanism.

For all of these reasons, the concept of a multiple use of the electrode wire in the same welding machine as expressed in U.S. Pat. No. 2,838,651 was not in practice realized and no suggestions to one of ordinary skill in the art could bring about such a multiple usage.

Also again in the later Swiss Pat. No. 370,175, multiple uses of electrode wires were considered in a welding machine serving for electrical resistance seam welding of coated sheet metal, and these also proved not to be practical. To be sure, there was no reduction in the diameter, only cleaning of the wire electrode after each passage so that therefore the problems existing with the reduction of the diameter of the wire electrode mentioned above in conjunction with the process of U.S. Pat. No. 2,838,651 did not appear. However, this cleaning also did not lead to the desired result that such already used and cleaned wire electrodes would lead to welding results approaching those equally as good as with a new wire. The reasons for this lie not only in the cleaning method employed but were in large measure system related, that is, in principle, inherent. With the cleaning methods employed, the principal method considered, i.e., the pulling of the electrodes wires through a cleaning die after use, with the impurities adhering to the wire in the form of tin parts being stripped away (Swiss Pat. No. 370,175, page 2, lines 27–30) was already considered to be unsatisfactory because of this. The adhering tin naturally did not permit itself to be stripped away in the cold condition and therefore only a very incomplete removal of the tin from the outer surface of the wire was made possible by means of this cleaning die which could not in any way lend to the wire an outer surface quality that was comparable with a new wire. Also, a further chemical cleaning method consisting of dissolving the tin from the outer surface of the wire by means of a diluted hydrochloric acid or a diluted caustic soda solution (Swiss Patent No. 370,175, Page 2, Lines 35–38) was practically then not considered feasible because such a chemical solution would have lasted too long and besides the hydrochloric acid or correspondingly the caustic soda would have attacked the outer surface regions of the wire covered with tin not at all or very weakly, and with that would have led to an unacceptable danger of wire breakage at heavily attacked wire positions. In contrast, a method of cleaning was likewise considered by melting tin from the used wire electrodes (Swiss Pat. No. 370,175, page 2, lines 38–41), for example, by passing the used wire electrode through a tin bath as well as a die positioned at the output of the bath to strip the fluid tin. The method at first appeared to be very promising because it permitted an outer surface quality of the used wire to be achieved that was at least as good as a new coated wire.

As it turned out, however, this form of cleaning also did not lead to a wire electrode that was usable again with welding results that were as good as those achieved with an (uncoated) new wire. The reason for this lay in the fact that the tin passing over the wire electrode during welding not only adhered to the outer surface of the copper wire but also penetrated the alloy formations in the copper coating lying on the outer surface, and the copper-zinc alloy created thereby in the outer surface coating of the wire had a specific resistance which amounted to a multiple of the specific resistance of the copper and was even substantially above the specific resistance of tin which itself is already approximately 6.5 times the specific resistance of copper. As a result of this high specific resistance of the copper-tin alloy stemming from welding by the wire electrodes in the outer surface coating of the wire during reuse of the wire, an extraordinarily intense heating is produced in this outer surface coating with the flow of welding current. This can lead to fusing of the wire to the weld, and in each case, to a substantially poorer weld quality than with the use of a new wire. Subsequent research showed then also that this reason for not reusing the wire was of decisive import, not only with cleaning by melting the tin but also with the other mentioned cleaning methods. It also showed thereto that by careful mechanical or chemical removal of the tin adhering to the outer surface of a used wire electrode as a result of the copper-tin alloy in the outer surface coating of the wire does not yield good welding results with the reuse of such a carefully cleaned wire electrode and that accordingly the formation of the copper-tin alloy coating in the outer surface coating of a wire electrode during welding is a fundamental impediment to a reuse of an already used wire electrode. A further basic impediment of a principal nature which stood in the way of the reuse of an already used and cleaned wire electrode as considered in the Swiss Patent No. 370,175 was also the previously mentioned flattening of the wire electrode under the pressure of the electrode rolls. This flattening naturally leads with each repeated use to a new and different cross section of the wire electrode and to achieve a constant weld quality, constant relationships, including a constant cross sectional shape of the wire electrode are indispensable quite apart from the fact that such variations of the cross sectional shape also required a change of the die employed for cleaning after each process to accommodate the altered cross section of the wire.

For the aforementioned reasons, the form of multiple uses of a wire electrode considered in Swiss Patent No. 370,175 were not practically obtainable in the same welding machine.

From the beginning of the practical realization of welding machines for electrical resistance seam welding of coated sheet metal with the help of wire electrodes, it appeared that a multiple use of the wire electrode was not possible. This was primarily due to the referenced fundamental impediments of the formation of a copper-tin alloy in the outer surface coating of the wire electrode with welding and the flattening of the wire electrode under the pressure of the electrode roll. No other choice remained for avoiding a loss of the relatively expensive copper employed for the wire electrodes than to melt the contaminated wires after their singular use. This choice corresponds to the suggestion already given in Swiss Pat. No. 370,175, page 2, lines 20–21. This process sets the melted, contaminated copper free from the tin in a refining process, the tin having been brought in to the process with the contaminated wires, partly in the form of a copper-tin alloy and partly in the form of tin adhering to the wire.

In the first years of practical application of the welding machine for electrical resistance seam welding of plated sheet metal with the help of wire electrodes, the gathering of the contaminated electrode wires after their singular use resulted in the used wire electrodes being wound onto a spool, which, for example, is apparent in Swiss Pat. No. 436,513, (FIG. Part 44). This method of gathering the used wire electrodes was, however, not advantageous for the anticipated reclaiming the copper insofar as the removal of the wire from the spool in each case required special handling, namely, either a time-consuming unwinding of the wire from the spool, or on the other hand, the use of special collapsible spools which permitted a removal of the entire wire winding from the spool. After a certain time, this problem was overcome and the used wires were no longer wound a spool as is apparent, for example, from Swiss Pat. No. 519,961 (page 2, line 14, and FIG. 1). There, the used wire was stored in so-called container windings as are known, for example, from Swiss Pat. No. 552,336 (page 1, lines 65–69, FIG. 1, part 37). In the meantime the effective welding speeds had also increased substantially in comparison to those which had previously been achieved with the resistance seam welding described in Swiss Patent No. 436,513. With this increase of the effective welding speed, naturally also the assault on the used wire per unit of time was increased substantially. Also correspondingly enlarged container windings were employed, which enabled the daily yield of used wire to be assimilated. In the meantime, further development included in particular overcoming the already mentioned bow formation with resistance seam welding with only one wire electrode running over the two electrode rolls, as described in Swiss Pat. No. 536,163. This was accomplished by using a wire hardened by flattening before the introduction of the wire into the first electrode roll. With this further development, the effective welding speeds were sharply increased in comparison to those which had previously been produced by the method of welding described in Swiss Patent No. 436,513, which had only one wire electrode running over to the electrode rolls. In this method, this wire was wound onto a roll after use. Since this increase in the effective welding speed naturally also increased substantially the attack on the wire used per unit of time, correspondingly large container windings were also employed, which windings could accept the quantity of used wire attacked daily. Here then in conjunction with the above-mentioned melting and refining began the problem that the incoming volume from the irregularly stored wire in the container winding was substantially larger than the proper copper volume of the wire and yielded with it also an incomplete utilization of the capacity of the copper converter for refining. In order to avoid this insufficient utilization of the copper converter and for better utilization of the same to achieve the largest possible ratio of proper copper volume to that incoming volume from the used wire, the process was changed to one in which the used wire was cut into short wire pieces of approximately 20 to 40 millimeters in length right at the welding machine by means of the so-called wire cutters. This was apparent, for example, as indicated in the Soudronic Prospectus "VSA 50 E" (second page, righthand column, second paragraph), and also from the Schuler-Prospectus "LCS Body Welder" (page 7, diagram wire guidance and righthand column, lines 1-4). Accordingly these "wire clippings" held in a container were then guided into a copper converter for reclaiming the copper of the process. The copper pieces naturally required a substantially smaller volume in the container than a corresponding quantity of the wire irregularly stored in the said winding container.

A further development of this technique applied practically in the last ten years, in which the electrode wire is cut into short pieces after a single utilization and from these then the copper is reclaimed by means of melting and refining, represents the previously unpublished proposal, which was performed in recent times. This proposal comprises cutting the wire into substantially finer wire pieces of only 1-3 millimeters in length and placing these "wire granules" with the help of a press under such a high pressure that the copper is transformed into a fluid condition, in some cases with additional warming. Then the copper can be pressed in accordance with a type of well known extrusion presses through a matrix into a copper strand of 2-5 millimeters diameter which afterward can be drawn in a drawing device into a wire with a suitable diameter to again be employed as a wire electrode. With testing for technical achievement of this proposal, however, a series of unforeseen problems arose, in particular with the transformation of the granules into a thick, flowable material without captured air. These problems caused considerable difficulties and until now could only be overcome with experimental models. In each case, this process was successful for a long time only in the experimental arena to produce wires which were again insertable as wire electrodes in welding machines. Quite apart from this, it has been proven that the technical expenditure for this production method is substantially higher on account of the original problems and the resulting high investment costs for a design corresponding to the proposal than if one melted the referenced wire pieces in a conventional manner, refined these, extruded them, and then drew the wires from these extrusions.

In summary, it can be said that with all the known and proposed forms of recycling electrode wires used and consumed in electrical resistance seam welding with wire electrodes, it is commonly held for a long time that in practice only single uses of copper wires forming such electrodes are possible. Only the copper is capable of being covered from the single-use wire electrodes and all experiments and proposals for a multiple utilization of these copper wires have been frustrated in practice until now.

The invention has as a principal object to provide a method of the foregoing type by which the copper wire can in practice actually be passed on to a further utilization after its first use as a wire electrode for electrical resistance seam welding. Nothing else remains any longer than to introduce the used electrode wires of waste value for reclaiming of the copper.

In accordance with the invention, it is possible to accomplish the method of the above-mentioned type by passing the formed and contaminated copper wire after its first use to a wire drawing device consisting of a plurality of drawing steps, and there to draw the wire in such a manner that the distances of the peripheral regions of the wire most distant from the center of the wire are reduced in all drawing stages and the distances of the peripheral regions of the wire lying nearest to the center of the wire are reduced in at least part of the drawing stages. Further, the distances of the peripheral regions of the wire most distant from the center of the wire are reduced successively in the drawing stages at least to such an extent that they become smaller than the distances of the peripheral regions of the wire nearest to the center of the wire before drawing, and the distances of the peripheral regions lying nearest to the center of the wire are reduced in said part of the drawing stages to such an extent that after passing the last drawing stage, they are as large as the distances of the peripheral regions of the wire having previously been most distant from the center of the wire. In this manner, a new round copper wire with circular cross section and a smaller diameter than the smallest outer dimension of said formed and contaminated copper wire is drawn from said formed and contaminated copper wire in the wire drawing device, and this new round copper wire is supplied for a further application.

The principal advantage of the foregoing method is that for the first time resistance seam welding of plated sheet metal is made possible with the help of wire electrodes whereby the wire electrodes no longer simply add to the operating costs, but to the contrary, contribute to a reduction of the ordinary operating cost because the new copper wire stemming from the foregoing method has a smaller diameter than the electrode wire originally employed. For this reason, the value of the new round copper wire stemming from the foregoing process per unit weight is greater than the value of the copper wire originally employed as the wire electrode. Surprisingly, it can be established that the properties of the new copper wire derived from the foregoing process differ not at all or only in a negligible degree from the properties of a corresponding wire drawn directly down to the same diameter in a wire drawing process and lie well within the standard tolerances. Therefore, contrary to every expectation, the tin from the wire electrodes after use in resistance seam welding that is carried with the plated sheet metal, partly adhering to its outer surface and partly contained in the copper-tin alloy in its outer surface coating, influences the properties of the round copper wire drawn from the wire electrodes in a negligible manner. This is just as true for the electrical properties, for example, the specific resistance, as well as for the mechanical properties, for example, the hardness and ultimately as well as for the appearance of the newly drawn round copper wire and the shiny gap-free outer surface of the same. Further research on these surprising results suggests that the tin carried along from the wire electrodes obviously shifts while drawing the wire into the regions of the so-called slip planes where various zones of the copper crystals substantially forming the wire rub against one another during drawing. This is the reason that, for example, the electrical conductivity of the wire in its longitudinal direction and also the tensile strength of the wire in the longitudinal direction for all intents and purposes is not influenced at all by the injected tin. The original tin adhering to the electrode wire is obviously deposited in the form of an atom like coating on the exterior surface of the wire as long as it does not get into the wire interior in the drawing process, and accordingly cannot influence the electrical and mechanical properties of the wire in its lengthwise direction in any case. In this connection, it is appropriate to note that in resistance seam welding by means of wire electrodes the welding current itself does not flow in the longitudinal direction of the wire but in a transverse direction through the wire. It is therefore easy to explain why already used wire electrodes provide substantially poor welding results upon reuse because there, of course, the welding current must flow through the exterior copper-tin alloy and the tin adhering to the wire surface, while a current flowing in the lengthwise direction of the wire flows past such outer surface coatings.

In each case, with the foregoing method the results produced for the first time since the original development of welding machines with electrical resistance seam welding showed that the electrodes employed for welding did not give rise to perpetual operating costs but instead contributed to a reduction in the ordinary operating costs. This is because, as earlier, so still if goods were welded directly with electrode rolls (and the welding of coated sheet metal which was only first made possible through the application of wire electrodes was still not possible), the operative surfaces of the electrodes coming in contact with the welded goods (usually shiny steel sheet metal) were consumed. After a certain operating time, this led to an inferior weld quality so that the electrode rolls had to be changed from time to time after a particular operating time and with this naturally came perpetual operating costs.

With the drop in perpetual operating costs for the electrodes, the foregoing method of resistance seam welding accordingly brings forth generally a substantial technical advance. With it within the realm of resistance seam welding of shiny steel sheet metal, for which welding directly with electrode rolls was not outweighed on grounds of cost until now, one can proceed to welding by means of wire electrodes and thereby produce savings in addition to the improvement of the weld quality.

Further advantages can also be achieved in the realm of resistance seam welding with the foregoing method and the help of wire electrodes. So, for example, with the application of the foregoing process resulting in a drop-off of the perpetual operating costs for the electrodes resulting from it, it is possible without more to proceed from the method of welding with only one wire electrode guided over an electrode roll. This welding with one wire electrode was employed almost exclusively in the last two decades in the technique of resistance seam welding with the help of wire electrodes back to the original form of welding known, for example, from Swiss Patent No. 370,175 with a special wire electrode for each of the two electrode rolls. With the new method, it is possible to simplify the entire process of resistance seam welding with the help of wire electrodes without again incurring higher operating costs, because the conversion from welding with just one special electrode for each of the two wire electrodes on the one hand to welding with only one wire electrode guided over the two electrode rolls was certainly exclusively for the reduction of wire consumption. The operating costs associated with the conversion were taken in hand but brought with it a few difficult technical problems which could be overcome only with an increased apparatus expense for the corresponding welding machine. The application of the foregoing process and the simultaneous conversion to welding with just one special wire electrode for each of the electrode rolls permitted this increased apparatus expense to be again reduced whereby simultaneously the operating costs still dropped off. These costs until now had still been incurred for the wire electrodes guided over the two rolls.

Additional advantages are achievable with a further embodiment of the invention.

As a rule, the new copper wire drawn in the drawing device with the foregoing method is guided or passed from one of said first uses to a further, different use. One of the first uses being identical to the further use is not generally foreclosed, however, it is scarcely ever considered in practice because the diameters of the new drawn wire as a rule lie below the ordinary range of diameters for wire electrodes employed for resistance seam welding. The further use differing from said first use can advantageously be one such that the new copper wire is employed for conducting current in the direction of the wire and, if appropriate, in a permanent application, preferably as a signal conduit or wire winding. The advantage of one of said first uses differing from the further use is that in this case as is already mentioned above, the effects of the properties of the new drawn copper wire are foreclosed by the first utilization.

Advantageously, the new copper wire drawn in the drawing device by the foregoing method can be provided with an insulating sleeve, preferably with a coating of paint, before passing the wire further on to said additional application. This is true in particular in the case of said application as a signal conductor or wire winding. Also, it can be advantageous for these and other applications to anneal the new drawn copper wire in the drawing machine after passing through the last stages by heating the wire to a temperature corresponding at least to its recrystallization temperature and preferably to a temperature lying above this temperature.

If the copper wire is hardened so much by the foregoing process before its first use that its elongation after the first utilization is still less than ten percent, the deformed and contaminated copper wire after its first utilization should be annealed appropriately before passing it through the first stage of the drawing device. This is accomplished by heating the wire to a temperature corresponding at least to its recrystallization temperature, and preferably to a temperature lying above this temperature. The annealing has the advantage that wire breakage as a result of working the wire during processing through the drawing device is substantially foreclosed.

If a wire drawing device employed in the foregoing process has an operating capacity per unit of time which amounts to a multiple of the consumption rate of the electrodes per unit of time from one of said electrical welding machines employed for the resistance seam welding, then it is substantial advantage for improved use of the operating capacity of the drawing machine to gather the wire electrodes after their use as wire electrodes from a plurality of said welding machines used for seam welding, and to feed these gathered, deformed, and contaminated copper wires one after the other to the drawing machine. For gathering of a wire electrode after its use in a welding machine, a driven spool can be employed appropriately, preferably a flanged spool onto which the electrode wire is brought in layers. This operation preferably is controlled by the welding machine and the spool is preferably located on the welding machine. It is advantageous to employ a common drawing device for a plurality of welding machines corresponding to those with the attacked and used wires, in particular for large production facilities with a plurality of welding machines. There, a separate drawing machine is worthwhile and such special machines designed for wire drawing can process substantially larger quantities or rates of wire than are attacked by one welding machine. One such unassociated wire drawing machine, however, naturally can process with advantage the used wires gathered from a plurality of smaller production facilities having only one or two such welding machines.

FIG. 1 illustrates schematically a first use of the copper wire as an electrode in an electrical resistance seam welding machine.

FIG. 2 illustrates schematically a drawing device through which the copper wire after use as an electrode is processed for a subsequent use.

FIG. 3 illustrates the cross section of the basic copper wire prior to any use.

FIG. 4 illustrates the cross section of the copper wire after it has been deformed for use as a wire electrode in the electrical resistance seam welding machine of FIG. 1.

FIG. 5 illustrates the cross section of the copper wire after it has been processed in the drawing device of FIG. 2.

In FIG. 1 a basic copper wire 20 is first used as an electrode in an electrical resistance seam welding machine 12. The wire initially has a round shape with a center 13 with a diameter D1 as shown in FIG. 3 and is deformed by a profiling unit 10 into a substantially flat wire 22 as shown in FIG. 4 with dimensions A and B. In this deformed configuration, the wire 22 is introduced into the electrical resistance seam welding machine as an electrode. Welding machines of this type are well known in the art as indicated in the above-referenced Swiss Patent No. 370,175 and others.

During the welding process, the wire becomes contaminated with the material being welded, for example, the tin from a plated sheet, and thus the used wire 24 leaving the welding machine is not generally suitable for recycling within the welding machine. The used wire 24 is received on a spool 14 for temporary storage prior to further processing in accordance with the present invention.

In a preferred embodiment of the foregoing process, the copper wire is formed by the first use into a wire with a cross sectional shape in which the distances of the peripheral regions of the wire lying closest to the center of the wire are less than 0.7 times the distances of the peripheral regions of the wire most distant from the center of the wire. After the first use, the deformed and contaminated copper wire 24 is drawn in the wire drawing device shown in FIG. 2 comprised of multiple stages of drawing dies 18 and a drawing spool 16. The holes of the dies are preferably sized such that distances of the peripheral regions of the wire lying closest to the center of the wire before drawing are reduced only in the last few drawing stages. Accordingly only the distances of the peripheral regions most distant from the wire center are reduced in the first or the first few drawing stages. Accordingly, at least in the last or last few drawing stages, and preferably in all of the drawing stages, drawing dies are employed with rotationally symmetric drawing holes to form the new wire 26 with a circular cross section of diameter D2 shown in FIG. 5. The application of drawing dies with rotationally symmetric drawing holes naturally has the advantage a substantially reduced technical expense in contrast to an application of drawing dies with the cross section of the dies corresponding to the cross section of the wire since the manufacture of drawing dies with non-rotationally symmetric drawing holes is exceptionally complex and correspondingly expensive. The drawing dies are used up in operation and therefore must be periodically replaced. However, on the other hand, in drawing wires with a cross sectional form departing from the circular form, there is naturally a danger of using drawing dies with rotational symmetric drawing holes, of bending the wire in the direction of its peripheral regions lying closest to the wire center during the drawing process. This danger is naturally greater the smaller the ratio of the distances of the peripheral regions of the wire lying closest to the center to the distances of the peripheral regions lying farthest from the wire center. If this ratio is greater than 0.7, then this danger is small and also if this ratio is between 0.5 and 0.7, this danger can still be kept small by maintaining the cross sectional reduction of the wire in the associated drawing dies relatively small in contrast to the customary reduction in cross section. However, if this ratio is smaller than 0.5, and in particular smaller than 0.4, then quite frequently the guideline of maintaining a relatively smaller cross sectional reduction in the corresponding drawing die is no longer valid. In order to keep the danger of such a bending of the wire during the drawing process sufficiently small and in this case it is recommended then to employ a guiding means to prevent such a bending.

A corresponding further form of said preferred embodiment of the foregoing invention is characterized in that the copper wire is transformed in the first application to a wire with a cross sectional form in which the distances of the peripheral regions lying closest to the center of the wire are preferably less than 0.5 times the distances of the peripheral regions of the wire most distant from the center of the wire. The deformed and contaminated wire after its first use is drawn through the rotationally symmetric drawing holes provided in the corresponding drawing stages of the drawing device. In at least one portion of those drawing stages only the distances of the peripheral regions most distant from the wire center are reduced. In at least one part of these drawing stages provided with rotationally symmetric drawing holes in which only the distances of the peripheral regions most distant from the center are reduced, the wire is guided into the drawing holes by a guiding means projecting from the entrance of the holes inwardly of the holes and being of the type such that the bending of the wire in a direction of one of the peripheral regions lying closest to the center of the wire during the drawing process is avoided. The essential advantage is that with the employment of such a guiding means the said guideline of a relatively small cross sectional reduction of the wire the corresponding drawing die can be disregarded without creating the danger of the bending of the wire in the drawing process. Naturally, the application of such a guiding means substantially reduces the number of drawing steps in the drawing device. Thus, the application of such a guiding means can also be of considerable advantage if the ratio of the distances of the peripheral regions of the wire lying closest to the wire center to the distances of the peripheral regions of the wire most distant from the wire center is equal to or larger than 0.5, in particular between 0.5 and 0.7.

A plate positioned at the inlet side of the drawing die can be employed with special advantage as a guiding means for guiding the wire into the drawing hole. The plate is provided with a slit as well as two noselike projections arranged on the side of the plate facing the drawing die and projecting into the drawing hole. The projections are oppositely disposed with nose ridges deviating from one another. The nose ridges lie adjacent to the wall of the rotationally symmetric drawing hole and have wall surfaces facing one another and connecting, preferably gap-free, with the two walls bounding the slit. At least in the region or regions of the drawing hole, in which hole or hole the cross section narrows from the inlet side to the outlet side of the die, the ridges are separated from one another by a distance at least approaching the distance of the peripheral regions of the wire lying closest to the wire center, so that the slit together with the wall surfaces of the noselike projections facing one another, and the wall surfaces of the drawing hole not covered by the projections form a drawing canal in which only the distances of the peripheral regions of the wire coming in contact with the wall surfaces of the drawing hole not covered by the projections and most distant from the wire center are reduced, and in which canal a bending of the wire in the direction of one of its peripheral regions lying closest to the wire center is avoided by the wall surfaces of the noselike projections facing one another. The advantage of employing such a plate provided with a slit and noselike projections and positioned at the inlet side of the drawing die as the guide means for guiding the wire into the hole is that the combination of the plate with the rotationally symmetric drawing die so arranged forms a drawing canal corresponding to the cross section of the wire to be drawn through the drawing die. However, the only parts requiring replacement as a result of wear consist of the rotationally symmetric drawing dies because the noselike projections of the plate serve certainly only to guide the wire, not, however, to reduce the cross section and because of this they practically never wear out. Therefore, the plate need not be exchanged with the replacement of the rotationally symmetric dies.

Securing means can be advantageously employed for fastening the drawing die and the plate together so that the die and the plate are rotatable relative to one another and can be fixed at various angular positions. In this manner, the drawing die is fully usable n times by setting the drawing die and the plate relative to one another in different angular positions, each displaced from one another by 180°/n, wherein n is a whole number that is greater than one and smaller than or at most equal to 90°/arc sin (a/d) and wherein a is equal to the distance of the peripheral regions of the wire lying closest to the wire center and d is equal to the diameter of the drawing hole at the position of minimum cross section.

The advantage of applying such a securing means and the multiple orientations of the guide made possible by it is a corresponding multiplication of the longevity of the drawing die. This, in combination with the general advantages of the guide means for guiding the wire in the drawing hole already mentioned above, and since the guideline requiring relatively small cross sectional reductions of the wire in the drawing dies can be disregarded and correspondingly, the number of drawing steps in the drawing device can be kept relatively small, a drawing device to be provided in which indeed the capital expenses as well as the operating costs can be minimized. The drawing device is therefore especially suited for direct installation in a welding machine.

In particular, with relatively large reductions in the cross sections of the wire per drawing step, it is recommended to employ a plate, such as the plate having the slit and the noselike projections, wherein at least the wall portions coming in contact with the wire running through the die, and preferably at least the noselike projections and the wall portions of the walls surrounding the slit associated with the projections, consist of hard metal. This has the advantage that with a considerable reduction of the wire cross section of the drawing die and the potential bending of the wire brought about by this reduction, as well as the corresponding high level of friction of the same at the wall surfaces of the noselike projections facing one another produce practically no wear of the wall surfaces at all.

The invention consists further of a device for accomplishing the foregoing method. The device is characterized by a welding machine for electrical resistance seam welding with the help of wire electrodes. A drawing device is integrally incorporated in the welding machine for drawing the used wire electrodes attacked during the welding process in the form of deformed and contaminated copper wires to produce new copper wires with a circular cross section and a smaller diameter than the smallest outside measurement of the deformed and contaminated copper wires. The advantage of such integration of the drawing device and the welding machine in the first place is that the welding machine besides its main product, that is, the welded sheet metal, also delivers a finished byproduct and not just an intermediate product requiring further processing in a separate drawing device. A further advantage is the adaptability of the drawing device integrated into the welding machine to the operating conditions established in the welding machine such as, for example, the possibility of drawing the wire in the integrated drawing machine almost as fast as it can be produced as a result of a relatively small exit speed of the used wire electrode out of the welding station in comparison to the ordinary drawing speed and the correspondingly small drawing speed of the wire in the integrated drawing device.

The invention comprises further a device for accomplishing the foregoing method and is characterized by a plurality of welding machines for electrical resistance welding with the help of wire electrodes as well as means for gathering of the attacked and used wire electrodes at each welding machine. The electrodes are in the form of deformed and contaminated copper wire. A separate drawing machine is provided with an operating capacity per unit of time corresponding at least to the total wire electrode consumption rate of all of these machines per unit of time. The separate machine draws the gathered and used wire electrodes from all of these welding machines into new copper wires with a circular cross section and a smaller diameter than the smallest exterior measurement of the deformed and contaminated copper wire.

The advantage of such a design lies in the processing of the used wire electrode attacked in all of the welding machines of this design in said separate drawing machine and as a result of this, dispensing with individual drawing devices at each individual welding machine. There is, as well, a reduced technical expense resulting therefrom for the total design. Such a conceptual design has the further advantage that it also is applicable to the already existing production schemes as well as the available welding machines in that these welding machines simply are provided with a corresponding accessory apparatus for gathering the used wire electrodes.

Advantageously, with this design, the means for gathering the used wire electrodes can consist at least of a driven spool, preferably a flanged spool, at each of the welding machines for winding the used wire electrodes, means for driving the spool and control means for controlling the drive as well as preferably means for bringing the used wire electrodes onto the spool in the lengthwise direction. Here it is advantageous if the spool of all welding machines are standardized in a design such that each of these spools is directly insertable into the unloading device of the individual drawing machines.

The invention is further described by way of example below with the aid of two exemplary embodiments.

In the first of the embodiments, a half-hardened polished copper wire having a diameter of 1.38 mm with a wire cross section of 1.496 mm$^2$, a tensile strength at the two percent elongation limit of 19.5 Kg/mm$^2$ and a specific resistance at 20° C. of 0.01747 ohms.mm$^2$/m is put to a first use at a speed of 0.78 m/sec. in a fully automatic welding machine for electrical resistance welding of can bodies from 0.18 mm heavily coated steel sheet metal. The welding is performed the help of only one wire electrode guided over both electrode rolls and initially is flattened to prevent the formation of a bow in the wire slide between the two electrode rolls in accordance with Swiss Patent No. 370,175. The flattening takes place in a crushing device with two driven rollers forming a hard wire in the shape of a flat wire with a height of 0.73 mm and a maximum width of 1.82 mm with two substantially flat electrode surfaces of 1.67 mm width at its upper and lower side and a wire cross section of 1.292 mm$^2$. This wire is lengthened by approximately 15.8% and is hardened to a tensile strength at the two percent elongation limit of 29.2 Kg/mm$^2$. The flattened and hardened wire electrode permits the crushing apparatus to operate with a speed of approximately 0.9 m/sec. as a result of the elongation through the flattening and is guided in this respect at such a speed over the first two electrode rolls so that its upper side is facing the weld and its lower side the electrode roll. Tin is transferred to the upper side of the wire electrode facing the weld from the lower of the two edges of the sheet metal to be welded, the metal being plated steel. The upper side of the wire electrode guided over the first of the electrode rolls comes into contact with the sheet metal while passing the welding point. The tin penetrates partially into the exterior wire surface at this upper side of the wire electrode as a result of the welding current flowing through it and the heating of the wire electrode resulting therefrom as well. The tin in the corresponding upper surface coating forms a copper-tin alloy. Also, tin is partially spread over the upper side of the wire electrode in a thin tin coating. In this regard, the wire electrode runs in a slide, namely the above mentioned wire slide, to a second of the two wire electrode rolls and there is guided over the same such that its lower side which is still not contaminated with tin faces the weld and its upper side faces the electrode roll. Tin, therefore, is transferred to this lower side of the wire electrode facing the weld from the upper of the two sheet metal edges to be welded together, the metal being plated steel. The underside of the wire electrode guided over the second roll comes in contact with the sheet metal as the wire passes the welding position. The tin in any case penetrates partially into the exterior wire surface at this underside of the wire electrode as a result of the welding current flowing in it as well as the heating of the wire electrode resulting therefrom, and forms in the corresponding upper surface coating a copper-tin alloy. The tin also is partially spread over the lower side of the wire electrode in a thin tin coating. In passing the second wire electrode, there is additionally a small lengthening as well as a corresponding reduction in cross section of the wire electrode which is attributable to the combined effects of the heating of the wire electrode at the welding position due to the current flowing therethrough and the work hardening of the wire resulting therefrom, and a relatively large tensile stress operating on the wire which is exerted on the wire by one of the feeding devices advancing the wire past the second of the electrode rolls. Therefore, the flat wire leaving the second electrode roll has still only has a wire cross section of 1.23 mm$^2$, a height of 0.71 mm, a total width of 1.78 mm, a width of its two flat surfaces of 1.63 mm, and tensile strength at the two percent extension limit of 20.4 Kg/mm$^2$. Additionally, the wire has extended approximately 5.1% so that it passes the aforementioned feeding device with a speed of 0.95 mm/sec. After leaving the delivery device, this flat wire contaminated with tin on its two flat sides is wound lengthwise onto a flanged spool by means of a winding device connected to the welding machine. The flanged spool is driven from a drive motor in which the rotational speed is regulated by means of a measuring device establishing the wire tension between the feed device and the flanged spool.

The measuring device is of the type such that the wire tension between the feed device and the flanged spool remains substantially constant at approximately 5 Kg/mm². The winding device is therefore provided with two spools onto which the wire is alternatively wound. At any given moment if a spool is fully wound, the wire is automatically cut, the end of the wire is secured to the full spool, the new beginning of the wire is fixed to the other empty spool, and then the wire is wound on this other spool. During the winding of the other spool, the full spool is removed and an empty spool is substituted in its place. At the next change, the wire is then wound onto the empty spool. In this manner, the spool change can take place in the winding device without interrupting the welding operation. Corresponding winding devices which also consist of a drive motor, the rotational speed regulating device for the same, the measuring device for measuring the wire tension, and a wire guiding device for lengthwise winding are certainly known from the technique of wire manufacture as well as the other technique of manufacturing textile fibers. These devices therefore need not be described any further. The full spools of these welding machines and a large number of other similar type welding machines can then be passed to a drawing machine where the flat wire can be drawn from the loaded spools one after the other with a speed of approximately 9.2 m/sec. The wire can be drawn in the drawing device of the same to a new copper wire of 0.6 mm diameter. Due to the feed rate of the flat wire being pulled from the spools at approximately 9.2 m/sec and the output speed of the wire at the above mentioned feeding device of the welding machine being 0.95 m/sec., the wire drawing machine has a processing capacity which is sufficient for processing spools wound with flat wire from nine to ten welding machines at approximately the same daily operating time as the welding machine. In the drawing device of the wire drawing machine, the flat wire is drawn in drawing stages into the new round copper wire with 0.6 mm diameter. In all ten drawing stages, the drawing dies employed have rotationally symmetric drawing holes in which the diameter varies from the narrowest positions in the series respectively as follows: 1.69 mm, 1.58 mm, 1.455 mm, 1.32 mm, 1.18 mm, 1.04 mm, 0.905 mm, 0.782 mm, 0.684 mm and 0.6 mm. The speed of the wire as it is passed to the drawing device and, as already mentioned above, amounts to 9.2 m/sec. and after each drawing step in the series is approximately as follows: 9.72 m/sec., 10.45 m/sec., 11.42 m/sec., 12.71 m/sec., 14.43 m/sec., 16.73 m/sec., 19.89 m/sec., 24,36 m/sec., 30.78 m/sec., and 40 m/sec. Correspondingly, the elongation of the wire produced at each of the individual stages of the series is approximately 5.66%, 7.46%, 9.33%, 11.31%, 13.49%, 15.96%, 18.92%, 22.43%, 26.39% and 29.96% and the wire cross section amounting to approximately 1.23 mm² at the input of the first drawing stage is reduced in each individual drawing stage of the series approximately as follows: 1.16 mm², 1.08 mm², 0.99 mm², 0.89 mm², 0.78 mm², 0.66 mm², 0.57 mm², 0.46 mm², 0.37 mm², and 0.28 mm². After leaving the last drawing stage, a new drawn copper wire is annealed in the drawing machine, still in the continuous process. To this end firstly, the wire is preheated to a temperature lying approximately between 80° C. and 110° C. along a preliminary annealing stretch approximately two meters long by means of a current passing through the wire. Then the wire is heated to a temperature lying between 220° C. and 250° C. in a canal of approximately 2 m in length forming the so-called primary annealing stretch in a water-steam-protective gas atmosphere serving to prevent oxidation of the wire. The heating here is likewise by means of an electrical current passing through the wire. In this regard, after leaving this canal the wire is then wound on spools by means of a winding device with a basic construction like the winding device already described above, and thereafter the wire is passed through a painting device for insulation. After leaving the painting device, the new insulated copper wire is passed to a further use, for example, as a signal conductor in a telephone cable or as a winding for an electric motor. The new copper wire has a conductive cross section of 0.283 mm², a tensile strength at the two percent extension limit of 11.3 Kg/mm² and a specific resistance at 20° C. of 0.01734 ohms.mm²/m and is not different in its electrical and mechanical properties from a corresponding wire drawn directly from a drawing machine.

With a second embodiment, a partially softened shiny copper wire of 1.36 mm diameter and a cross section of 1.453 mm², a tensile strength at a two percent elongation limit of 19.7 kg/mm² and a specific resistance of 20° C. of 0.1749 ohm.mm²/m is guided for a first use or application with a speed of 0.66 m/sec. in a fully automatic welding machine for electrical resistance seam welding of can bodies. The can bodies are made from a 0.19 mm heavily tinned steel sheet metal nd the welding is performed with the help of only one electrode wire guided over both electrode rolls.

And there, firstly, the wire is deformed once and hardened into a hard wire to prevent the formation of a bow in the wire slide between the two electrode rolls according to Swiss Patent No. 370,175 in combination with the Swiss Application No. 5117/83-6. In this manner, however, the copper wire in this embodiment is first drawn from its diameter of 1.26 mm to a diameter of 1.2 mm and a wire cross section of 1.131 mm² in a first deformation stage by means of a drawing die. The wire is thereby lengthened by about 28.4% and brought to a wire speed of approximately 0.85 mm/sec. Simultaneously, the wire is hardened to a tensile strength at the 0.2% strain limit of 32.6 Kg/mm² and then this 1.2 mm strong copper wire is flattened in a second deformation stage in a crushing apparatus with two drive rollers to a flat wire having a height of 0.58 mm and a width of 1.8 mm larger with two substantially flat electrode surfaces of 1.74 mm width at its upper and lower sides and with a wire cross section of 1.058 mm². In this manner, the wire is again extended by approximately 6.9% and with this is brought to a wire speed of 0.91 m/sec. Simultaneously, the wire is hardened further to a tensile strength at 2% strain of 38.3 Kg/mm². The flat wire is then guided over the two electrode rolls in the same manner as in the first embodiment and leaves the second electrode roll likewise with a copper-tin alloy in the exterior surface coating of its two flat sides and a thin coating of tin on the same surface. Additionally, the wire has a reduced hardness and smaller strain as well as a corresponding reduction in cross section. Therefore, after departing the second roll, the wire still only has a cross section of 1.009 mm², a height of 0.57 mm, a total width of 1.8 mm, a width of its two flat sides of 1.71 mm, and a tensile strength at 2% strain of 23.8 Kg/mm². Further, the wire has a 4.9% additional strain so that it passes the conveying device located beyond the electrode roll at a speed of 0.95 mm/sec. After departing the conveying device, this contaminated flat wire with tin on both of its flat sides is passed directly to a drawing device connected directly with the drawing machine and driven synchronously with the conveying device. There, the wire is drawn with others in the six drawing stages to a new copper wire having a diameter of 0.5 mm. In all six stages, diamonds with rotationally symmetric drawing holes are employed as drawing dies the holes of which at the actual narrowest position having in series diameters of 1.43 mm, 1.14 mm, 0.844 mm, 0.701 mm, 0.578 mm, and 0.5 mm. The speed of the wire with its passage through the drawing device, as already mentioned, is approximately 0.95 mm/sec. and after each individual drawing stage in the series is approximately 1.21 m/sec., 1.54 m/sec., 2.06 m/sec., 2.74 m/sec., 3.66 m/sec., and 4.88 m/sec. Correspondingly, there is produced in each individual drawing stage of the series, a wire extension of approximately 27.19%, 27.57%, 33.28%, 33.41%, 33.49%, and 33.37%, and the wire cross section amounting to approximately 1.01 $mm^2$ at the introduction to the first drawing stage is reduced in each individual drawing stage of the series to approximately 0.793 $mm^2$, 0.622 $mm^2$, 0.466 $mm^2$, 0.35 $mm^2$, 0.262 $mm^2$, and 0.196 $mm^2$. Since the technical expense for a wire drawing device connected to the drawing machine should naturally be kept as small as possible and correspondingly, the number of drawing stages with such a drawing device should be kept as small as possible, a substantially larger reduction of the wire cross section than in the first embodiment described above, is produced with the foregoing embodiment, as is especially apparent in the first drawing stage. With this reduction in wire cross section of 27% to 33.5%, there is the danger of the drawing of flat wires in the application of drawing dies with rotationally symmetric drawing holes—otherwise, than with the small reduction of wire cross section of only 5 to 10% in the first three drawing stages of the drawing machine in the first embodiment above that the bending of the flat wire will occur in the direction of its peripheral region lying closest to the wire center during the drawing process. This danger is naturally the greater the flatter the wire and the smaller the ratio of the wire height to the wire width. Since this relationship in the foregoing example lies in the region between 0.3 and 0.5 for the first three drawing stages with 0.57: 1.80=0.317; 0.57: 1.43=0.399; and 0.57: 1.14=0.5, which is relatively small, and simultaneously relatively large reductions in wire cross section of 27.19%, 27.57% and 33.28% are provided in the first three drawing stages; guide means for guiding the wire in the first three drawing dies are provided in the foregoing example in the first three drawing stages to avoid bending of the flat wire in the drawing process. The guide means indeed takes the form of one plate positioned at each one of the inlet sides of the drawing dies, each plate being provided with a slit as well as two noselike projections extending into the drawing holes and positioned on the side of the plate facing the drawing dies. The projections are positioned opposite one another with nose ridges departing from one another. The nose ridges of the projections rest against the wall if the rotationally symmetric hole and the wall surfaces facing one another connect without a gap to the two walls bounding the slit. The slit together with the wall surfaces of the noselike projections and the wall surfaces of the drawing hole not covered by these projections form a drawing canal with a canal cross section matched to the cross section of the wire pulled through it, whereby the canal walls have a distance of approximately 0.1 mm from the edge surfaces of the wire at the canal inlet in which there is practically no reducing portion in the drawing hole and a distance of approximately 0.025 mm at the canal outlet. The wall surfaces of the noselike projections facing one another lie in the reducing regions of the drawing holes in parallel planes and have a distance of 0.6 mm. The plates are rotatably fastened to the supports of the drawing dies so placed and are adjustable to certain angular positions. Indeed the plates provided in the first and second drawing stages have actually three angular positions adjustable relative to one another by 60°, and the plate provided in the third drawing stage is adjustable in two positions at 90° relative to one another. In this manner, the drawing dies in the first and second drawing stages are adjustable three times and the die in the third drawing stage twice. With this multiple adjustability of the drawing dies in the first three drawing stages, and the employment of diamonds as drawing dies the operative lifetime of the drawing dies is more than decades with the foregoing relatively small drawing speed through the welding machine and the correspondingly minimal dwell time of the wire in the drawing device. Thus, the drawing dies practically need never be replaced. To prevent the guiding surfaces provided for guiding the wire from wearing out, that is, the wall portion of the plates coming in contact with the moving wire, the noselike projections and the connecting wall portions of the walls bounding the slit consist of a hard metal. With this, the plates also achieve a lifetime that is as long as that of the drawing dies, since these guiding surfaces to be sure only serve to guide, and in contrast to the drawing dies, do not perform any cross sectional reducing operations. Correspondingly, in any event if they consist of a hard metal, they are practically never wear out. Also in order to minimize the friction within the drawing dies, a drawing oil is fed over the plates of the drawing canal in the first three drawing stages. Indeed in such small quantities, the drawing oil clings to the wire as an oil film and for all practical purposes is not wiped from the drawing dies. The oil adhering to the wire is also sufficient for lubrication in the last three drawing stages so that in these drawing stages it is not necessary to feed any oil. After leaving the last drawing stage, the new drawn copper wire is still covered with a thin film of oil which remains on the wire and in later production operates as a protective coating for protecting the shiny wire against corrosion. The drawing dies of all drawing stages are surrounded in customary fashion with cooling jackets which are connected to the water cooling system of the welding machine. It is to be noted that in this connection, however, water cooling of the drawing dies is not absolutely necessary since the frictional heating created in the drawing dies on account of the previously described relatively small drawing speed through the drawing machine is relatively small and therefore conventional cooling by means of the surrounding ambient atmosphere would also suffice. After departing the last drawing stage, the new drawn copper wire then is further annealed in a continuous process. Added to this, the wire is firstly preheated along a pre-annealing stretch of approximately 30 cms to a temperature of approximately 80° C.–110° C. by means of an electrical current conducted through the wire. Then, the wire is heated along a main annealing stretch of approximately 30 cms to a temperature of 220° C.–250° C. likewise by means of an electrical current conducted through the wire. Finally, the wire is guided through a cooling stretch of approximately 30 cms. The pre-annealing stretch and the main annealing stretch and the cooling stretch can be kept quite short on account of the relatively small speed of the wire at only 4.88 m/sec. To avoid oxidation with annealing, the pre-annealing stretch, the main annealing stretch, and the cooling stretch lie in the foregoing case in a S-shaped canal penetrated by nitrogen from the exit of the cooling stretch. In this regard, the nitrogen is employed as a protective gas for the welding. The canal can extend further still along the whole drawing device which is considered especially if the drawing dies are to forego water cooling, the flowing nitrogen is substituted instead for a conventional cooling system and also oxidation of the wire is to be avoided during drawing with greater heating in the drawing dies. Moreover, in the latter case, the pre-annealing stretch can also be discarded. The stream of nitrogen enters the referenced canal at the exit of the cooling stretch and then flows in the opposite direction from wire movement through the canal section comprising the cooling stretch, the main annealing stretch, and the pre-annealing stretch. Finally, if necessary, the gas flows still further through the canal section including the drawing device and is then conducted as a protective gas through the welding station. After departing the cooling stretch, the new and annealed round copper wire lubricated with the film of drawing oil is wound onto spools by means of a winding device having the basic construction already described above in connection with the first embodiment, and is then passed with the spool to a further application.

In closing, reference should be made to the definitions of the concept employed. The wire centers are defined by dividing the wire transversely to its lengthwise direction into thin disks, and then defining the center as the line on which the center of gravity of the individual disks would lie. The "minimum outside dimension of the deformed and contaminated copper wire" is described as the minimum distance between two points on the exterior surface of the wire connected by a straight line running through the wire center.

We claim:

1. A method permitting multiple applications of a copper wire which is employed in a first use or application as a wire electrode for electrical resistance seam welding, particularly for tinned sheets, and for this purpose is deformed into a wire having a plurality of concentric peripheral regions about a longitudinal center with a cross-section different from a circular form, particularly into a substantially flat wire, before this first application and hardened in this form and which is contaminated during this first application in that region coming into contact with a weld by material originating from the weld and passing over to the wire during welding, characterized in that after the first application, the deformed and contaminated copper wire is passed to a wire-drawing device comprising a multiplicity of drawing stages and is drawn there in such a manner that the distances of the peripheral regions of the wire most distant from the center of the wire are reduced in all drawing stages and the distances of the peripheral regions of the wire nearest to the center of the wire are reduced in at least one part of the drawing stages and further that the distances of the peripheral regions most distant from the center of the wire are reduced successively in the drawing stages, at least to such an extent that said regions become smaller than the distances of the peripheral regions nearest to the center of the wire before drawing and that the distances of the peripheral regions nearest to the center of the wire are reduced in the said one part of the drawing stages to such an extent that after passing the last drawing stage they are as large as the distances of the peripheral regions of the wire having previously been most distant from the center of the wire, all of the drawing and reduction steps being carried out on the copper wire while retaining in the drawn wire material on the wire entering the drawing device so that a new round copper wire with circular cross-section and a smaller diameter than the smallest outside dimension of said deformed and contaminated copper wire is drawn from said deformed and contaminated copper wire in the wire-drawing device, and that this new round copper wire is supplied for a further application.

2. A method according to claim 1 characterized in that the new copper wire drawn in the drawing device is supplied for a further application different from said first application.

3. A method according to claim 2 characterized in that said additional application different from the first application to which the new copper wire drawn in the drawing device is supplied is a permanent application, preferably as a signal conductor or winding.

4. A method according to claim 1 characterized in that the new copper wire drawn in the drawing device before being passed to said additional application is provided with an insulating sleeve, preferably a coating of paint.

5. A method according to claims 1 characterized in that the new copper wire drawn in the drawing device is annealed after leaving the last drawing stage by heating the wire at least to a temperature corresponding to its recrystallization temperature and preferably to a temperature exceeding the recrystallization temperature.

6. A method according to claim 1 characterized in that before the first application, the copper wire is hardened so much that its elongation after the first application is less than ten percent; and after the first application, the deformed and contaminated copper wire is annealed before passing through the first stage of the drawing device by heating to a temperature corresponding at least to its recrystallization temperature and preferably to a temperature above the recrystallization temperature.

7. A method according to claim 1 characterized in that a drawing device is employed which has an operating capacity per unit of time amounting to a multiple of the wire electrode consumption rate per unit of time of one of a plurality of welding machines employed for said electrical resistance seam welding, and that for improved utilization of the operating capacity of the wire drawing machine, the wire electrodes from several welding machines employed for said electrical resistance seam welding are collected after their use as electrodes and these collected, deformed, and contaminated copper wires are then passed one after another to the wire drawing device.

8. A method according to claim 7 characterized in that for gathering of a wire electrode after its use in a welding machine, a driven spool, preferably a flanged spool, is employed, and the wire electrodes are wound onto this spool longitudinally and the drive for the spool is controlled by the welding machine and is preferably located at the welding machine.

9. A method according to claim 1 characterized in that the copper wire is deformed in the first application to a wire with a cross sectional shape in which the distances of the peripheral regions of the wire lying closest to the center of the wire are less than 0.7 times the distances of the peripheral regions of the wire most distant from the center of the wire, and that after the first utilization, the deformed and contaminated wire is drawn in the drawing machine such that the distances of the peripheral regions of the wire lying closest to the center of the wire before the drawing are only reduced in the last or the last few stages and accordingly in the last or the last few drawing stages, only the distances of the peripheral regions most distant from the wire center are reduced, whereby at least in the last or the last few drawing stages, preferably however, in all drawing stages, drawing dies are employed with rotationally symmetric drawing holes.

10. A method according to claim 9 characterized in that the copper wire is deformed in the first application to a wire with a cross section in which the distances of the peripheral regions of the wire lying closest to the wire center are preferably less than 0.5 times the distances of the peripheral regions of the wire most distant from the wire center, and that the copper wire deformed and contaminated after the first application is drawn in a drawing device and in at least one part of the drawing stages in which only the distances of the peripheral regions most distant from the wire center are reduced through the rotationally symmetric drawing dies provided in the corresponding drawing stages, and the wire is guided into the drawing dies by guiding means projecting inwardly into the drawing device at the inlet such that a bending of the wire in the direction of one of its peripheral regions lying closest to the wire center is avoided during the drawing process.

11. A method according to claim 10 characterized in that a plate positioned at the inlet of the drawing device is employed as the guide means for guiding the wire into the drawing die of the first drawing stage, the plate being provided with a slit as well as with two nose-type projections positioned on the side of the plate facing the drawing die and projecting into the drawing hole, which projections stand opposite one another with ridges of the projections deviating from one another and extending adjacent to the wall of the rotationally symmetric drawing die in the first stage, and the wall, surfaces of the projections connecting preferably without a gap to two walls defining the slits in the plate and have at least in the region or regions of the drawing holes in which a cross section or cross sections of the holes are reduced from the inlet side toward the outlet side of the dies a distance from one another corresponding at least approximately to the distance of the peripheral regions of the wire lying closest to the wire center, so that the slit together with the associated walls of the nose-type projections and the wall surfaces of the drawing holes not obstructed by these projections form a drawing canal in which only the distances which are most distant from the center of the wire are reduced by the peripheral regions of the drawing hole not covered by the projections, and in which a bending of the wire in the direction of one of its peripheral regions lying closest to the wire center is prevented by the surfaces of the nose-like projections.

12. A method according to claim 11 characterized in that for securing the drawing die and plate, securing means are employed and permit the drawing die and the plate to be rotated relative to one another and to be set in various angular positions so that the drawing die is fully usable n times by setting of the drawing die and plate relative to one another in n various angular positions displaced from one another at each 180°/n whereby n is a whole number which is larger than 1 and smaller or at the most equal to 90° divided by arc sin a/d wherein a is equal to the distance between the peripheral regions of the wire lying closest to the wire center, and d is equal to the diameter of the drawing hole at the position of its minimum cross section.

13. A method according to claim 11 characterized in that for the plate provided with the slit and the nose-like projections, a plate is employed in which its wall portions coming in contact with the wire extending therethrough, preferably at least the nose-like projections and the associated wall parts of the walls bounding the slit, consist of a hard metal.

* * * * *

UNITED STATES PATENT AND TRADEMARK OFFICE
CERTIFICATE OF CORRECTION

PATENT NO. : 4,820,896
DATED : April 11, 1989
INVENTOR(S) : Weil et al.

It is certified that error appears in the above-identified patent and that said Letters Patent is hereby corrected as shown below:

Column 16

Line 28, delete "nd" and substitute --and--.

Column 18

Line 35, delete "are".

Column 20

Line 32, delete "claims" and substitute --claim--.

Signed and Sealed this

Sixth Day of March, 1990

Attest:

JEFFREY M. SAMUELS

*Attesting Officer*      *Acting Commissioner of Patents and Trademarks*